United States Patent
Glaser et al.

(10) Patent No.: US 7,086,684 B2
(45) Date of Patent: Aug. 8, 2006

(54) EXTENDABLE PROTECTIVE AWNING AND MOTOR VEHICLE HAVING A PROTECTIVE AWNING

(75) Inventors: Joachim Glaser, Gechingen (DE); Carsten Mueller, Steinheim (DE); Waldemar Wallenwein, Rangendingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/823,526

(22) Filed: Apr. 12, 2004

(65) Prior Publication Data

US 2005/0016692 A1    Jan. 27, 2005

(30) Foreign Application Priority Data

Apr. 11, 2003    (DE) ................ 103 16 592

(51) Int. Cl.
*B60J 7/00* (2006.01)

(52) U.S. Cl. .................................... 296/99.1

(58) Field of Classification Search ........... 296/99.1, 296/98, 135, 136.1, 136.11–136.13; 160/238, 160/265, 266, 277, 278, 291, 351, 368.1, 160/370.21, 370.22
See application file for complete search history.

(56) References Cited

U.S. PATENT DOCUMENTS

| | | | | |
|---|---|---|---|---|
| 1,425,954 A * | 8/1922 | Fischer | ...................... | 296/99.1 |
| 1,704,994 A * | 3/1929 | Shallenberger | ............. | 296/152 |
| 2,248,538 A * | 7/1941 | Liebler | .......................... | 296/98 |
| 2,532,989 A * | 12/1950 | Biondi | ......................... | 160/92 |
| 2,555,942 A * | 6/1951 | Supplee | ...................... | 296/26.1 |
| 3,292,971 A * | 12/1966 | Zucker | ...................... | 296/99.1 |
| 4,171,013 A * | 10/1979 | Clark | .......................... | 160/22 |
| 4,201,412 A * | 5/1980 | Williams et al. | ............ | 296/163 |
| 4,717,196 A * | 1/1988 | Adams | ......................... | 296/98 |
| 4,786,099 A * | 11/1988 | Mount | ......................... | 296/98 |
| 4,958,881 A * | 9/1990 | Piros | ......................... | 296/98 |
| 5,284,198 A * | 2/1994 | Kauka | .......................... | 160/70 |
| 5,476,302 A * | 12/1995 | Ronci | ...................... | 296/99.1 |
| 5,615,924 A * | 4/1997 | Owen | ........................ | 296/95.1 |
| 5,820,189 A * | 10/1998 | Tew | ........................ | 296/26.11 |
| 6,044,856 A * | 4/2000 | Cano | ........................ | 135/88.07 |
| D492,640 S * | 7/2004 | Greene et al. | ............. | D12/401 |
| 6,782,904 B1 * | 8/2004 | Tien | ........................ | 135/88.07 |
| 6,811,207 B1 * | 11/2004 | Dalpizzol et al. | ........... | 296/139 |

FOREIGN PATENT DOCUMENTS

| | | | | |
|---|---|---|---|---|
| DE | 003207134 A1 * | 9/1983 | .................. | 296/98 |
| DE | 39 09 937 | 10/1990 | | |
| EP | 000595741 A1 * | 5/1994 | ................. | 160/238 |
| EP | 000631025 A1 * | 12/1994 | ................. | 160/368.1 |
| JP | 358194622 A * | 11/1983 | ................. | 296/99.1 |
| JP | 358194626 A * | 11/1983 | ................. | 296/99.1 |
| JP | 359053227 A * | 3/1984 | ................. | 296/99.1 |
| JP | 363020216 A * | 1/1988 | ................. | 296/99.1 |

* cited by examiner

*Primary Examiner*—H Gutman
(74) *Attorney, Agent, or Firm*—Kenyon & Kenyon LLP

(57) ABSTRACT

In an extendable protective awning and motor vehicle having a protective awning, the protective awning includes a base frame which may be fastened to the vehicle and a protective surface which may be moved between at least one retracted basic position and an extended end position by a linkage. The base frame is designed for arrangement in the interior of the vehicle in the region of the upper boundary of a door, window or flap opening of the vehicle, so that the protective surface may be extended from its basic position through the opened door, window or flap opening into this position.

18 Claims, 3 Drawing Sheets

EXTENDABLE PROTECTIVE AWNING AND MOTOR VEHICLE HAVING A PROTECTIVE AWNING

CROSS-REFERENCE TO RELATED APPLICATIONS

The present application claims priority to Application No. 103 16 592.4, filed in the Federal Republic of Germany on Apr. 11, 2003, which is expressly incorporated herein in its entirety by reference thereto.

FIELD OF THE INVENTION

The present invention relates to an extendable protective awning for vehicles, having a base frame which may be fastened to the vehicle and a protective surface which may be moved between at least one retracted basic position and an extended end position by a linkage. The present invention also relates to a motor vehicle having a protective awning.

BACKGROUND INFORMATION

German Published Patent Application No. 39 09 937 describes an electrically moveable awning for a bus, which has a base frame which can be fastened to the vehicle and a protective surface which can be moved between a retracted basic position and an extended end position by a linkage. The base frame is integrated in a housing which can be integrated in the motor-vehicle body in the roof region of the bus. In this case, the awning is provided within a protective box which is open toward the surroundings of the vehicle. In the retracted basic position, the protective awning is arranged completely within the protective box.

As aspect of the present invention is to provide a protective awning which may be retrofitted in a simple manner.

SUMMARY

The above and other beneficial aspects of the present invention may be achieved by providing an extendable protective awning and a motor vehicle having a protective awning as described herein.

In an example embodiment of the present invention, an extendable protective awning for vehicles includes a base frame which may be fastened to the vehicle and a protective surface which may be moved between at least one retracted basic position and an extended end position by a linkage, in which the base frame is designed for arrangement in the interior of the vehicle in the region of the upper boundary of a door, window or flap opening of the vehicle, so that the protective surface may be extended from its basic position through the opened door, window or flap opening into the end position.

By the base frame being arranged in the interior of the vehicle and the awning being extended through a door, window or flap opening present in the series production state of the motor vehicle, for example, a tailgate opening, the protective awning may be mounted without impairing or damaging the outer skin of the body. In addition, no problems of any sort in sealing the interior may arise in comparison with the series production state of the motor vehicle, since the standard door, window or flap seals are retained. The outer dimensions of the vehicle are not changed.

In an example embodiment of the present invention, the base frame is integrated in a housing, an outer surface of the housing being designed in a manner matched to an interior surface in the region of the upper boundary of the door, window or flap opening.

The measures described herein may enable the outer surface of the housing to nestle against the interior surface, thus ensuring that it is accommodated in a space-saving manner.

In an example embodiment of the present invention, the linkage and the protective surface are arranged completely within the housing in the retracted basic position.

This may achieve a visually attractive design, and the protective awning may be protected against soiling or damage.

In an example embodiment of the present invention, the linkage is prestressed into the extended end position.

As a result, the protective awning may be automatically extended, for example, by pushing a button, and may be pushed in again manually or by an electric motor. If pushed in manually, electrical connections may not be needed for the retrofitting of the protective awning.

In an example embodiment of the present invention, the linkage is held in the retracted basic position by a latching lever which may be actuated from the interior of the vehicle.

This may make it possible, after the door opening which is provided with the protective awning has been opened, for the protective awning to still be extended from the interior, after the door has been opened, by simple actuation of the latching lever. The latching lever may be prestressed into the latching position, so that it automatically latches into place during the pushing-in process when the linkage has reached the retracted basic position.

In an example embodiment of the present invention, the linkage has at least two levers which are connected to each other in an articulated manner and, in the extended end position, adopt a dead-center latching position.

This may make it possible to achieve a secure locking of the protective awning in the end position without additional latching devices.

In an example embodiment of the present invention, the protective surface is designed as a flexible web of material which may be rolled up within the base frame onto a roller, the roller being prestressed to provide a movement pulling the web of material into the retracted end position.

In an example embodiment of the present invention, the linkage is designed as a scissors-type linkage.

A scissors-type linkage may make it possible to achieve a compact, stable construction with a large, obtainable, extended span.

In an example embodiment of the present invention, the housing has a base plate and a hood which may be fastened to the vehicle structure, the base plate being connected releasably to the hood, and the extendable protective surface and the linkage being fastened to the base plate.

The base plate may be connected to the hood via screws, a latching connection, a toggle connection, a bayonet catch, etc., for example. All of the mechanical, moveable components may be fastened to the base-plate module, and the hood may be designed as a pure fastening and covering part. After the hood has been fastened to the vehicle structure, the base plate together with all of the mechanical components may then be latched, for example, to the hood.

In accordance with an example embodiment of the present invention, an extendable protective awning for a vehicle includes a base frame fastenable to the vehicle, and a protective surface movable between at least one retracted basic position and an extended end position by a linkage. The base frame is configured to be arranged in an interior of the vehicle in a region of an upper boundary of one of (a) a door, (b) a window and (c) a flap opening of the vehicle, and the protective surface is extendable from the retracted basic position through an opened one of (a) the door, (b) the window and (c) the flap opening into the end position.

The base frame may be integrated into a housing, and an outer surface of the housing may be configured to match an interior surface in the region of the upper boundary of the one of (a) the door, (b) the window and (c) the flap opening.

The linkage and the protective surface may be arranged completely within the housing in the retracted basic position.

The linkage may be prestressed into the extended end position.

The extendable protective awning may include a latching lever actuatable from the interior of the vehicle and configured to hold the linkage in the retracted basic position.

The linkage may include at least two levers connected to each other in an articulated manner, and the levers may be configured to adopt a dead-center latching position in the extended end position.

The protective surface may include a flexible web of material rollable within the base frame onto a roller, and the roller may be prestressed to provide a movement to pull the web of material into the retracted end position.

The linkage may include a scissor-type linkage.

The housing may include a base plate and a hood fastenable to a structure of the vehicle, the base plate may be releasably connected to the hood, and the protective surface and the linkage may be fastened to the base plate.

In accordance with an example embodiment of the present invention, a motor vehicle includes an extendable protective awning as described herein. In an example embodiment of the present invention, the motor vehicle includes an extendable protective awning, which includes a base frame fastened to the vehicle, and a protective surface movable between at least one retracted basic position and an extended end position by a linkage. The base frame is arranged in a region of an upper boundary of one of (a) a door, (b) a window and (c) a flap opening in an interior of the vehicle, the protective surface extendable from the retracted basic position through an opened one of (a) the door, (b) the window and (c) the flap opening into the end position.

Further features and aspects are set forth in the following description of an example embodiment of the present invention in conjunction with the appended Figures.

DETAILED DESCRIPTION

Figure 1:
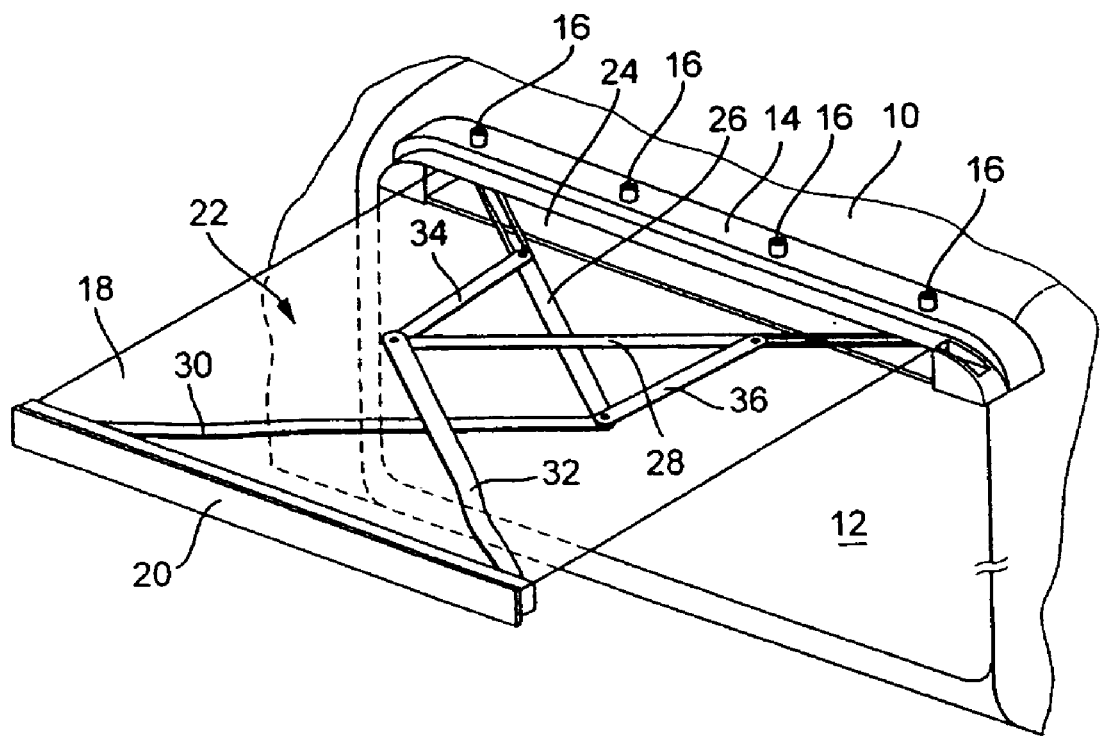
FIG. 1 is a perspective, partial view of a motor vehicle with a protective awning according to an example embodiment of the present invention in the extended end position.
Figure 2:
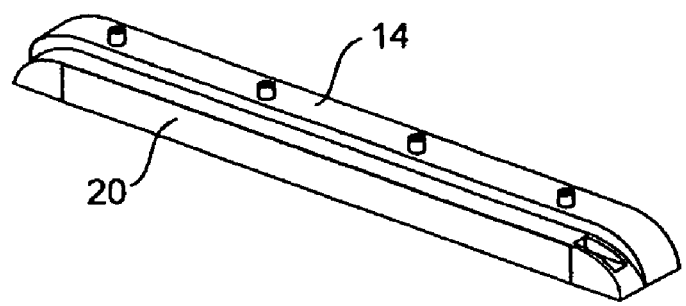
FIG. 2 illustrates shows the protective awning illustrated in FIG. 1 in the retracted basic position.

In the illustration of FIG. 1, part of a motor vehicle 10 having a door opening 12 is illustrated. The door opening 12 is designed, for example, as a sliding-door opening and is arranged at the side of the motor vehicle. A protective-awning housing 14 is arranged in the region of the upper boundary of the door opening 12. In this case, the motor-vehicle body is illustrated transparently, so that parts of the housing 14 which would actually be concealed in the illustration of FIG. 1 by the body of the motor vehicle 10 may also be seen. The housing 14 is connected to the body of the motor vehicle 10 via screws which extend through passage openings 16 in the housing 14. As illustrated in FIG. 1, the housing 14 is arranged within the interior of the motor vehicle 10. In the retracted state of the protective awning, as is illustrated in FIG. 2, none of its parts protrudes through the doors opening 12, and so the sliding door provided for closing the door opening 12 may close the door opening 12 in a conventional manner.

The protective awning according to an example embodiment of the present invention may therefore be retrofitted in a simple manner and, when it is retrofitted, the outer skin of the body is not impaired or damaged by the subsequent mounting of fastening parts on the outer skin. The outer dimensions of the motor vehicle 10 do not change when the door is closed. Another aspect is that no additional sealing measures of any sort may be incurred by the retrofitting of the awning, since the sliding-door sealing system present as standard is retained and remains functional.

A textile, flexible web of material 18, which is illustrated transparently for clarity, may be pulled out of the housing 14 of the protective awning. The flexible web of material 18 extends from the housing 14 as far as a transverse strip 20. The transverse strip 20 is guided on the housing 14 via a scissors-type linkage 22. In the retracted state of the awning, as is illustrated in FIG. 2, the transverse strip 20 closes an opening 24 in the housing 14, through which the scissors-type linkage 22 and the flexible web of material 18 are extended.

The scissors-type linkage 22 includes a total of six levers which are connected to one another in an articulated manner. Two first levers 26 and 28 are mounted pivotably at two opposite ends of the housing 14 and may be pivoted in a plane which is situated parallel to the extended, flexible web of material 18. FIG. 1 illustrates the extended end position of the protective awning, in which the first levers 26 and 28 extend away from the housing at an angle of approximately 40° and, starting from their point of articulation on the housing 14, cross over after approximately two thirds of their length.

Two second levers 30, 32 are articulated on the transverse strip 20 in a mirror-inverted manner with respect to the first levers 26, 28, the second levers 30, 32 being articulated on opposite ends of the transverse strip 20 in a manner such that they may pivot about a plane which is situated parallel to the extended, flexible web of material 18. Starting from the transverse strip 20, the second levers 30, 32 cross over after approximately two thirds of their length. At the respective end of the second levers 30, 32, which end is opposite the transverse strip 20, the second levers are connected pivotably to the first lever 26 and to the first lever 28, respectively.

As may be seen in the illustration of FIG. 1, the first and second levers 26, 28, 30 and 32 form a scissors-type linkage, by which the transverse strip 20 may be moved away vertically from the housing 14, so that the two ends of the transverse strip 20 are always at the same distance from the housing 14. An extended end position of the transverse strip 20 is defined by two third levers 34, 36 which are guided in each case by a slotted guide on the first levers 26 and 28, which are articulated pivotably on the housing 14. Each of the first levers 26, 28 has a slotted-guide mechanism which is designed as an elongated hole and, starting from the point of articulation of the respective first lever 26, 28, extends away from the point of articulation approximately over a third of the length of these levers. That end of the third levers 34 and 36 which is opposite the end which is guided in the slotted guide of the first levers 26 and 28 is connected to the first and second levers 26, 30 and 28 and 32, respectively, in a manner such that this end may be pivoted about the same pivot axis at which the first and second levers 26 and 30 and 28 and 32 are connected pivotably to one another. The third levers 34 and 36, which are guided by slotted guides, stabilize the scissors-type linkage 22, so that large spans may also be achieved in the extended end position, and the scissors-type linkage 22 may nevertheless be designed to be compact and lightweight. In the extended end position, which is illustrated in FIG. 1, the scissors-type linkage 22 may adopt a dead-center latching position, so that the exertion of pressure on the transverse strip 20 in the direction of the housing 14 does not readily lead to the awning being retracted. For example, in the extended end position, the third levers 34 and 36 adopt a dead-center latching position relative to the slotted guides in the first levers 26 and 28, respectively, and the third levers 34 and 36 therefore have to be moved out of their dead-center position before the transverse strip 20 is pushed in.

The illustration of FIG. 2 shows the very compact dimensions of the awning in the retracted state. In the retracted basic position, the transverse strip 20 ends flush with the outer surfaces of the housing 14. In addition to compact external dimensions, this may result in a very good protection of the scissors-type linkage 22, which is situated within the housing 14, and of the flexible web of material 18. In addition, the protective awning is designed in a visually attractive manner, and its smooth outer surfaces provide only a small potential for injury. The outer surface of the housing 14, which surface is at the top in FIG. 2, nestles against the contour of the interior in the region of the upper boundary of the door opening 12. As a result, optimum utilization of space may be achieved, and the headroom of the door opening 12 may not be excessively restricted.

Figure 3:
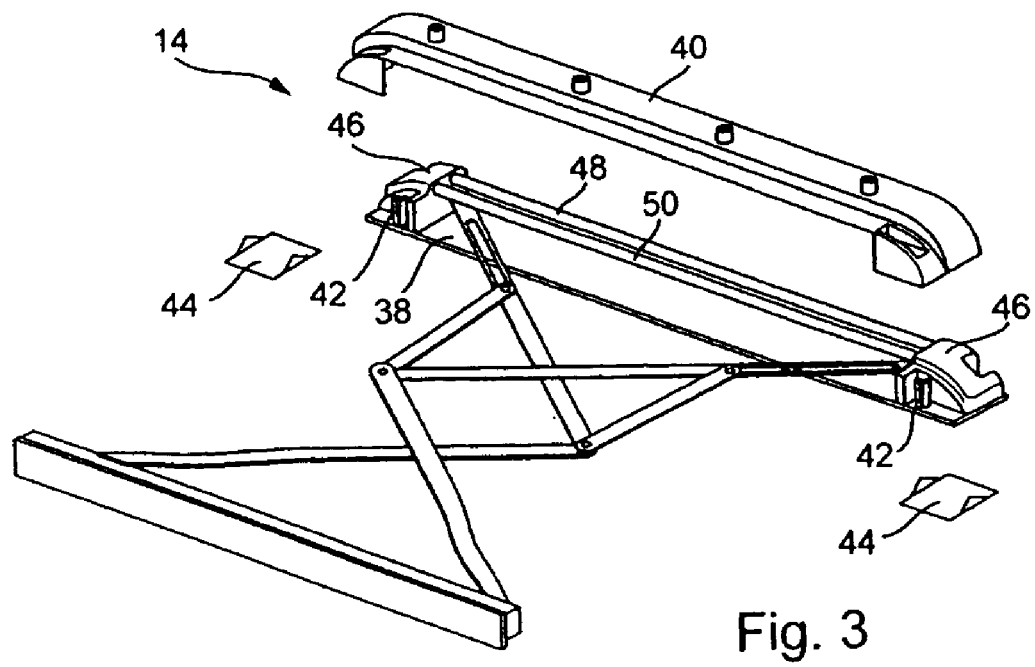
FIG. 3 is a view of the protective awning illustrated in FIG. 1 with the hood removed.

The illustration of FIG. 3 clarifies the construction of the housing 14. The housing 14 has a base plate 38 and a hood 40, it being possible for the hood 40 to be latched onto a plurality of latching-and-clamping pins 42 on the base plate 38. In the illustration of FIG. 3, only two of the latching-and-clamping pins may be seen. Instead of the latching-and-clamping pins 42, the base plate 38 may also be connected to the hood 40 by screw connections. The latching-and-clamping pins are accessible from the interior of the vehicle, i.e., from that surface of the base plate 38 which is at the bottom in FIG. 3, and covering plates 44 are provided at the right and left ends of the base plate 38 to cover the associated access openings.

The base plate 38 has, at its right and left ends, a respective projection 46 which is designed such that it floats downwardly toward the particular end of the base plate 38. As a result, the shape of the projections 46 is matched to the shape of the hood 40 and a corner region of the door opening 12. A roller 48 which is provided for receiving the flexible web of material 18 is mounted rotatably between the two projections 46. The roller 48 may be prestressed, for example, by spring drives in the projections 46, in such a manner that, in the relaxed state, the flexible web of material 18 is coiled completely onto the roller 48. However, for example, an electric motor drive for the roller 48 may also be provided within the projections 46.

A further roller 50 which is mounted rotatably between the two projections 46 is arranged in a direction parallel to the base plate 38. The roller 50 serves as a deflecting roller for the flexible web of material 18 when the latter is pulled in or extended.

Figure 4:
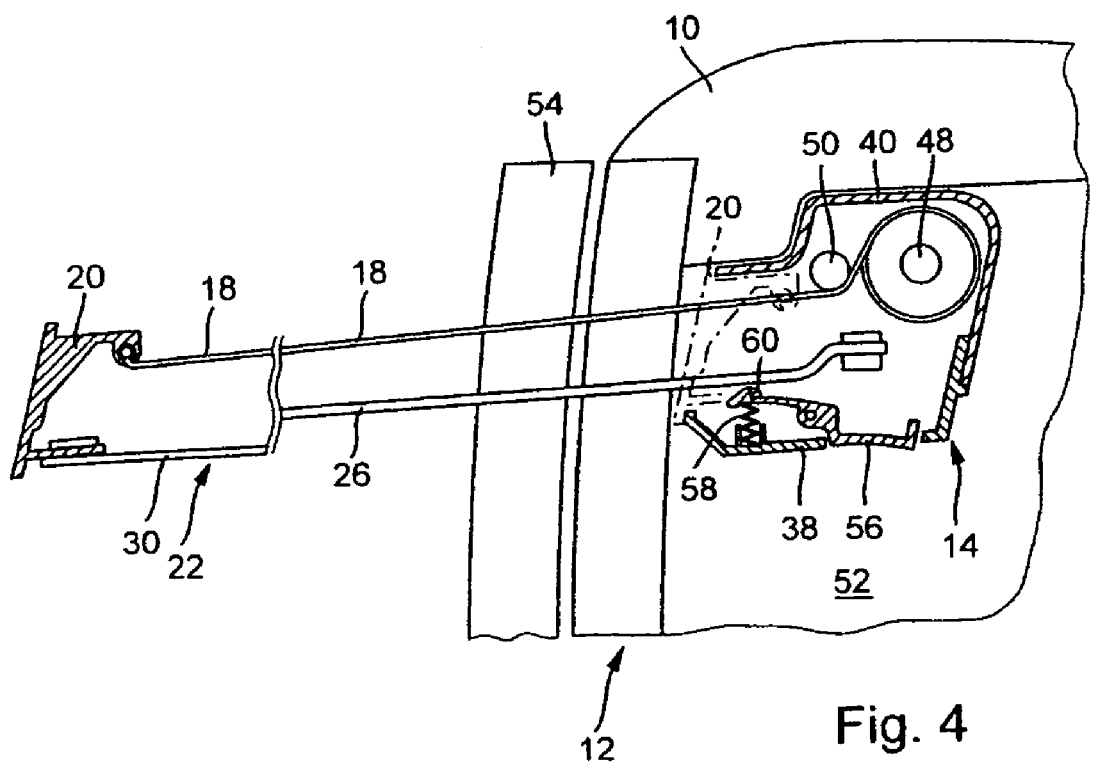
FIG. 4 is a cross-sectional view of the protective awning illustrated in FIG. 1 in the extended position.

In the cross-sectional view of FIG. 4, the arrangement of the awning may be seen more precisely. The housing 14 together with the base plate 38 and the hood 40 is arranged within an interior 52 of the motor vehicle 10. In the completely retracted basic position of the awning, the transverse strip 20 is also arranged within the interior 52 and bears against the hood 40 and against the base plate 38. The position of the transverse strip 20 in the retracted basic position is indicated in the illustration of FIG. 4 by chain-dotted lines. Since the awning is situated completely within the vehicle interior 52 in the retracted basic position, the door opening 12 may be closed in a conventional manner by the sliding door 54.

In the illustration of FIG. 4 it may furthermore be seen that the hood 40 of the housing 14 is matched to the contour of the motor-vehicle body in the region of the upper boundary of the door opening 12 and to the interior contour, which adjoins the upper boundary of the door opening 12.

As has already been described, the flexible web of material 18 is coiled onto the roller 48 or pulled off from the latter and in the process guided by the roller 50. The flexible web of material 18 is clamped to the transverse strip 20. This is achieved by an eyelet being formed at the end of the flexible web of material 18 and being arranged in a slot-like recess having an approximately circular cross-section. After a transverse rod has been pushed into the eyelet, the flexible web of material 18 may then no longer be pulled out of the recess and is secured on the transverse strip 20.

As has already been explained, the scissors-type linkage 22 is prestressed into the extended end position. This may be brought about, for example, by rubber pulls between the individual levers or spiral springs at the points of articulation of the first and second levers 26, 28 and 30, 32 on the housing 14 and transverse strip 20, respectively. The scissors-type linkage 22 is held in the retracted basic position by a latching lever 56 which is mounted pivotably on the base plate 38 and is prestressed by a spring 58. At its end situated within the housing 14, the latching lever 56 is provided with a latching lug which, in the retracted basic position, acts, for example, on the second lever 30 and prevents the latter from moving out of the housing 14. As a result, the entire scissors-type linkage 22 is fixed in the retracted basic position. An end of the latching lever 56, which end is opposite the latching lug, is accessible from the interior 52 through an opening in the base plate 38. If this end is pushed upwardly, i.e., into the housing 14, the latching lug 60 moves downwardly counter to the latching spring 58 and releases the second lever 30. As a result, the latter may move out of the housing 14, and the scissors-type linkage 22 moves together with the transverse strip 20 into the extended end position and, in the process, pulls the flexible web of material 18 off from the roller 48.

Figure 5:
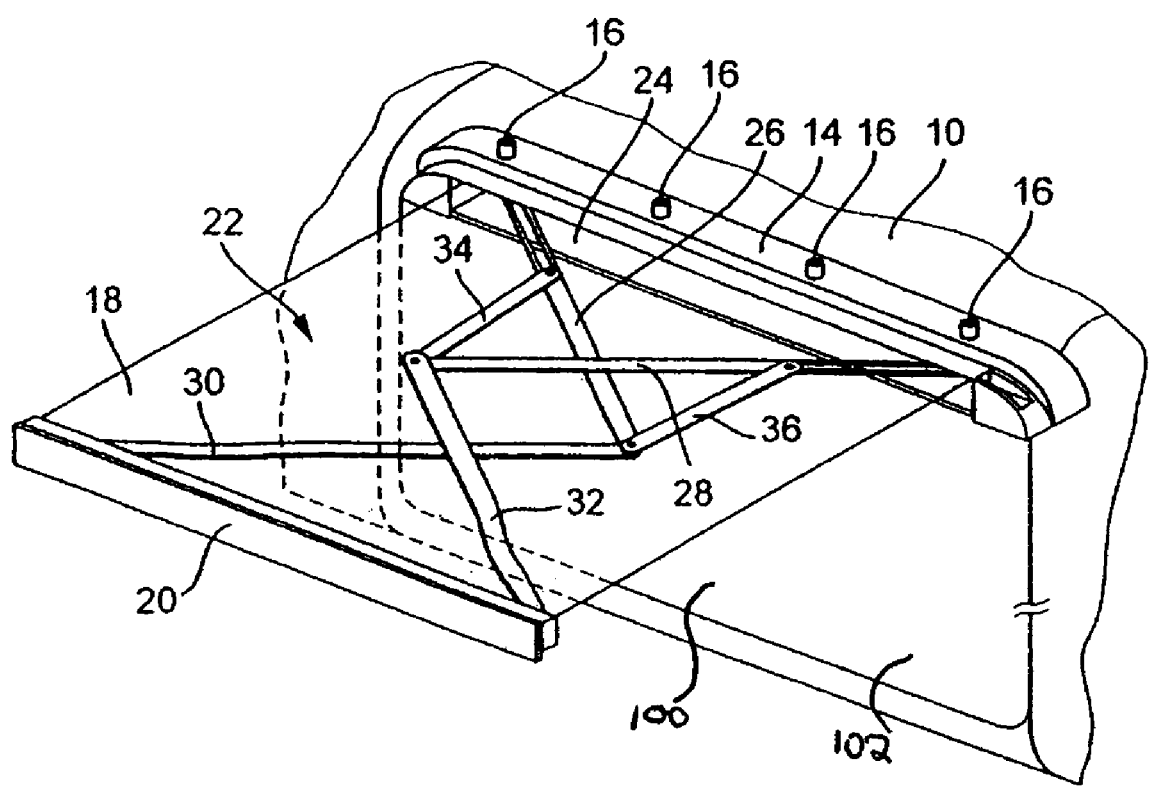
FIG. 5 is a perspective, partial view of a motor vehicle with a protective awning.

As illustrated in FIG. 5, the base frame is arranged in a region of an upper boundary of one of (a) a door, (b) a window 100 and (c) a flap opening 102 in an interior of the vehicle, the protective surface extendable from the retracted basic position through an opened one of (a) the door, (b) the window 100 and (c) the flap opening 102 into the extended end position.

What is claimed is:

1. An extendable protective awning for a vehicle, comprising:
   a base frame fastenable to the vehicle;
   a protective surface movable between at least one retracted basic position and an extended end position by a linkage which has at least two levers; and
   a deflecting roller positioned in the base frame;
   wherein the base frame is configured to be arranged in an interior of the vehicle in a region of an upper boundary of one of (a) a door, (b) a window and (c) a flap opening of the vehicle, the protective surface extendable from the retracted basic position through an opened one of (a) the door, (b) the window and (c) the flap opening into the end position, and the deflecting roller configured to deflect the protective surface during passage from the retracted basic position to the extended end position.

2. The extendable protective awning according to claim 1, wherein the base frame is integrated into a housing, an outer surface of the housing configured to match an interior surface in the region of the upper boundary of the one of (a) the door, (b) the window and (c) the flap opening.

3. The extendable protective awning according to claim 1, wherein the protective surface includes a flexible web of material rollable within the base frame onto a roller, the roller prestressed to provide a movement to pull the web of material into the retracted end position.

4. An extendable protective awning for a vehicle, comprising:
   a base frame fastenable to the vehicle; and
   a protective surface movable between at least one retracted basic position and an extended end position by a linkage;
   wherein the base frame is configured to be arranged in an interior of the vehicle in a region of an upper boundary of one of (a) a door, (b) a window and (c) a flap opening of the vehicle, the protective surface extendable from the retracted basic position through an opened one of (a) the door, (b) the window and (c) the flap opening into the end position, wherein the linkage is prestressed into the extended end position.

5. An extendable protective awning for a vehicle, comprising:
   a base frame fastenable to the vehicle; and
   a protective surface movable between at least one retracted basic position and an extended end position by a linkage;
   wherein the base frame is configured to be arranged in an interior of the vehicle in a region of an upper boundary of one of (a) a door, (b) a window and (c) a flap opening of the vehicle, the protective surface extendable from the retracted basic position through an opened one of (a) the door, (b) the window and (c) the flap opening into the end position, and further comprising a latching lever actuatable from the interior of the vehicle and configured to hold the linkage in the retracted basic position.

6. An extendable protective awning for a vehicle, comprising:
   a base frame fastenable to the vehicle; and
   a protective surface movable between at least one retracted basic position and an extended end position by a linkage;
   wherein the base frame is configured to be arranged in an interior of the vehicle in a region of an upper boundary of one of (a) a door, (b) a window and (c) a flap opening of the vehicle, the protective surface extendable from the retracted basic position through an opened one of (a) the door, (b) the window and (c) the flap opening into the end position, wherein the linkage includes at least two levers connected to each other in an articulated manner, the levers configured to adopt a dead-center latching position in the extended end position.

7. An extendable protective awning for a vehicle, comprising:
   a base frame fastenable to the vehicle;
   a protective surface movable between at least one retracted basic position and an extended end position by a linkage; and
   a deflecting roller positioned in the base frame;
   wherein the base frame is configured to be arranged in an interior of the vehicle in a region of an upper boundary of one of (a) a door, (b) a window and (c) a flap opening of the vehicle, the protective surface extendable from the retracted basic position through an opened one of (a) the door, (b) the window and (c) the flap opening into the end position wherein the base frame is integrated into a housing, an outer surface of the housing configured to match an interior surface in the region of the upper boundary of the one of (a) the door, (b) the window and (c) the flap opening into the end position, wherein the linkage and the protective surface are arranged completely within the housing in the retracted basic position and the deflecting roller configured to deflect the protective surface during passage from the retracted basic position to the extended end position.

8. An extendable protective awning for a vehicle, comprising:
   a base frame fastenable to the vehicle;
   a protective surface movable between at least one retracted basic position and an extended end position by a linkage; and
   a deflecting roller positioned in the base frame;
   wherein the base frame is configured to be arranged in an interior of the vehicle in a region of an upper boundary of one of (a) a door, (b) a window and (c) a flap opening of the vehicle, the protective surface extendable from the retracted basic position through an opened one of (a) the door, (b) the window and (c) the flap opening into the end position, wherein the linkage includes a scissor-type linkage, and the deflecting roller configured to deflect the protective surface during passage from the retracted basic position to the extended end position.

9. An extendable protective awning for a vehicle, comprising:
   a base frame fastenable to the vehicle;
   a protective surface movable between at least one retracted basic position and an extended end position by a linkage; and
   a deflecting roller positioned in the base frame;
   wherein the base frame is configured to be arranged in an interior of the vehicle in a region of an upper boundary of one of (a) a door, (b) a window and (c) a flap opening of the vehicle, the protective surface extendable from the retracted basic position through an opened one of (a) the door, (b) the window and (c) the flap opening into the end position wherein the base frame is integrated into a housing, an outer surface of the housing configured to match an interior surface in the region of the upper boundary of the one of (a) the door, (b) the window and (c) the flap opening into the end position, wherein the housing includes a base plate and a hood fastenable to a structure of the vehicle, the base plate releasably connected to the hood, the protective surface and the linkage fastened to the base plate, and the deflecting roller configured to deflect the protective surface during passage from the retracted basic position to the extended end position.

10. A motor vehicle, comprising:
an extendable protective awning, including:
 a base frame fastened to the vehicle;
 a protective surface movable between at least one retracted basic position and an extended end position by a linkage which has at least two levers; and
 a deflecting roller positioned in the base frame;
 wherein the base frame is arranged in a region of an upper boundary of one of (a) a door, (b) a window and (c) a flap opening in an interior of the vehicle, the protective surface extendable from the retracted basic position through an opened one of (a) the door, (b) the window and (c) the flap opening into the end position and the deflecting roller configured to deflect the protective surface during passage from the retracted basic position to the extended end position.

11. The motor vehicle according to claim 10, wherein the base frame is integrated into a housing, an outer surface of the housing configured to match an interior surface in the region of the upper boundary of the one of (a) the door, (b) the window and (c) the flap opening.

12. The motor vehicle according to claim 10, wherein the protective surface includes a flexible web of material rollable within the base frame onto a roller, the roller prestressed to provide a movement to pull the web of material into the retracted end position.

13. A motor vehicle, comprising:
an extendable protective awning, including:
 a base frame fastened to the vehicle; and
 a protective surface movable between at least one retracted basic position and an extended end position by a linkage;
 wherein the base frame is arranged in a region of an upper boundary of one of (a) a door, (b) a window and (c) a flap opening in an interior of the vehicle, the protective surface extendable from the retracted basic position through an opened one of (a) the door, (b) the window and (c) the flap opening into the end position, wherein the linkage is prestressed into the extended end position.

14. A motor vehicle, comprising:
an extendable protective awning, including:
 a base frame fastened to the vehicle; and
 a protective surface movable between at least one retracted basic position and an extended end position by a linkage;
 wherein the base frame is arranged in a region of an upper boundary of one of (a) a door, (b) a window and (c) a flap opening in an interior of the vehicle, the protective surface extendable from the retracted basic position through an opened one of (a) the door, (b) the window and (c) the flap opening into the end position, and further comprising a latching lever actuatable from the interior of the vehicle and configured to hold the linkage in the retracted basic position.

15. A motor vehicle, comprising:
an extendable protective awning, including:
 a base frame fastened to the vehicle; and
 a protective surface movable between at least one retracted basic position and an extended end position by a linkage;
 wherein the base frame is arranged in a region of an upper boundary of one of (a) a door, (b) a window and (c) a flap opening in an interior of the vehicle, the protective surface extendable from the retracted basic position through an opened one of (a) the door, (b) the window and (c) the flap opening into the end position, wherein the linkage includes at least two levers connected to each other in an articulated manner, the levers configured to adopt a dead-center latching position in the extended end position.

16. A motor vehicle, comprising:
an extendable protective awning, including:
 a base frame fastened to the vehicle;
 a protective surface movable between at least one retracted basic position and an extended end position by a linkage; and
 a deflecting roller positioned in the base frame;
 wherein the base frame is arranged in a region of an upper boundary of one of (a) a door, (b) a window and (c) a flap opening in an interior of the vehicle, the protective surface extendable from the retracted basic position through an opened one of (a) the door, (b) the window and (c) the flap opening into the end position wherein the base frame is integrated into a housing, an outer surface of the housing configured to match an interior surface in the region of the upper boundary of the one of (a) the door, (b) the window and (c) the flap opening, wherein the linkage and the protective surface are arranged completely within the housing in the retracted basic position, and the deflecting roller configured to deflect the protective surface during passage from the retracted basic position to the extended end position.

17. A motor vehicle, comprising:
an extendable protective awning, including:
 a base frame fastened to the vehicle; and
 a protective surface movable between at least one retracted basic position and an extended end position by a linkage; and
 a deflecting roller Positioned in the base frame;
 wherein the base frame is arranged in a region of an upper boundary of one of (a) a door, (b) a window and (c) a flap opening in an interior of the vehicle, the protective surface extendable from the retracted basic position through an opened one of (a) the door, (b) the window and (c) the flap opening into the end position, wherein the linkage includes a scissor-type linkage, and the deflecting roller configured to deflect the protective surface during passage from the retracted basic position to the extended end position.

18. A motor vehicle, comprising:
an extendable protective awning, including:
 a base frame fastened to the vehicle;
 a deflecting roller positioned in the base frame;
 a protective surface movable between at least one retracted basic position and an extended end position by a linkage;
 wherein the base frame is arranged in a region of an upper boundary of one of (a) a door, (b) a window and (c) a flap opening in an interior of the vehicle, the protective surface extendable from the retracted basic position through an opened one of (a) the door, (b) the window and (c) the flap opening into the end position wherein the base frame is integrated into a housing, an outer surface of the housing configured to match an interior surface in the region of the upper boundary of the one of (a) the door, (b) the window and (c) the flap opening, wherein the housing includes a base plate and a hood fastened to a structure of the vehicle, the base plate releasably connected to the hood, the protective surface and the linkage fastened to the base plate, and the deflecting roller configured to deflect the protective surface during passage from the retracted basic position to the extended end position.

* * * * *